US006834692B2

(12) United States Patent
Lindsay et al.

(10) Patent No.: US 6,834,692 B2
(45) Date of Patent: Dec. 28, 2004

(54) LOG DEBARKING TIP

(75) Inventors: David J. Lindsay, Vancouver, WA (US); Bruce Foerster, Beaverton, OR (US)

(73) Assignee: Lindsay Forest Products, Inc., Portland, OR (US)

( * ) Notice: Subject to any disclaimer, the term of this patent is extended or adjusted under 35 U.S.C. 154(b) by 281 days.

(21) Appl. No.: 10/214,800

(22) Filed: Aug. 7, 2002

(65) Prior Publication Data

US 2004/0025969 A1 Feb. 12, 2004

(51) Int. Cl.[7] .............................. B27C 13/00; B23P 15/28
(52) U.S. Cl. ...................... 144/241; 144/208.8; 407/48; 407/77; 407/113
(58) Field of Search .................... 144/208.1, 208.8, 144/208.41, 241, 240; 407/30, 46, 47, 48, 49, 66, 77, 101–103, 113, 114, 44, 88, 15, 16, 17

(56) References Cited

U.S. PATENT DOCUMENTS

| 4,231,406 A | * | 11/1980 | Jonsson ................ 144/208.8 |
| 4,657,056 A | | 4/1987 | Hutson |
| 4,852,622 A | | 8/1989 | Eriksson |
| 5,005,621 A | | 4/1991 | Woodham |
| 5,070,919 A | | 12/1991 | Ackerman |
| D331,931 S | | 12/1992 | Eriksson |
| 5,472,027 A | | 12/1995 | Ackerman |
| 5,893,401 A | | 4/1999 | Eriksson |
| 5,896,902 A | * | 4/1999 | Maybon ................ 144/329 |
| D409,631 S | | 5/1999 | Eriksson |
| 5,951,214 A | * | 9/1999 | Rothballer et al. .......... 407/42 |
| 6,244,312 B1 | | 6/2001 | Hoffman |

* cited by examiner

Primary Examiner—Allen Ostrager
Assistant Examiner—Shelley Self
(74) Attorney, Agent, or Firm—Ipsolon llp

(57) ABSTRACT

A tip for a rotary debarker has a polygonal main body with a front surface and a rear surface, and at least one cutting blade along each of the opposed edges. The main body includes a non-circular mounting boss extending from the rear surface. The main body is mounted to a tip holder that has a non-circular seat for receiving the non-circular mounting boss. The non-circular mounting boss and seat restrict relative movement between the tip and the holder during cutting operations. The tip is reversible relative to the holder to provide two operative cutting blades per tip.

18 Claims, 2 Drawing Sheets

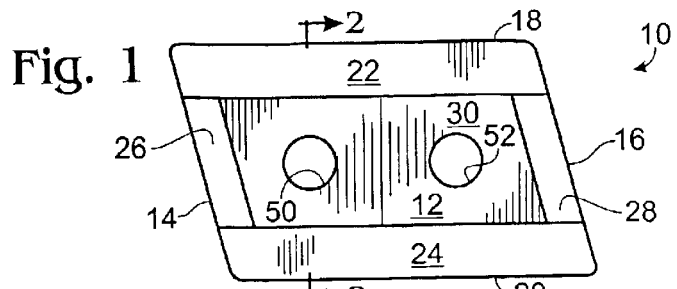
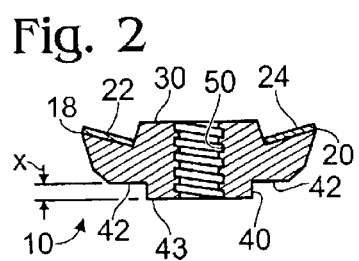
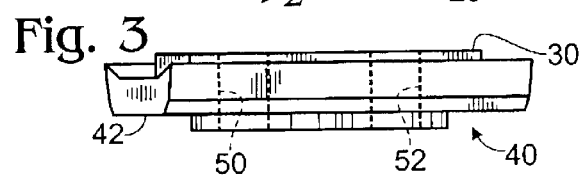
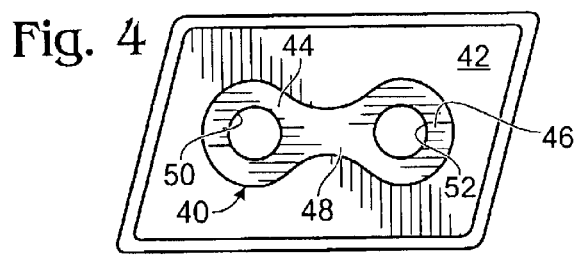
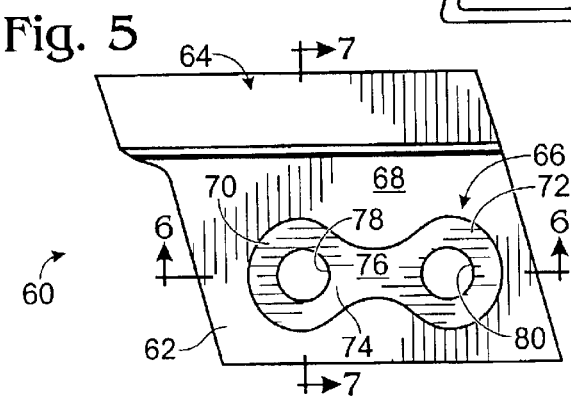
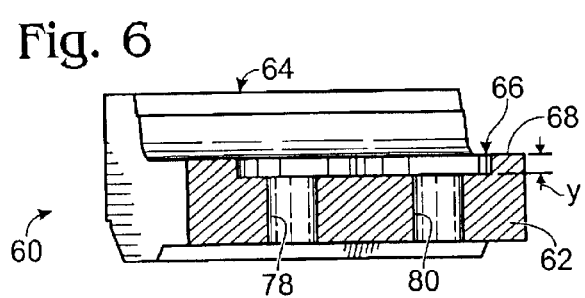
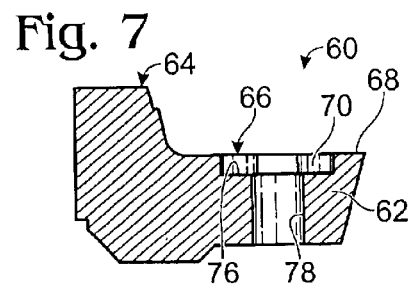

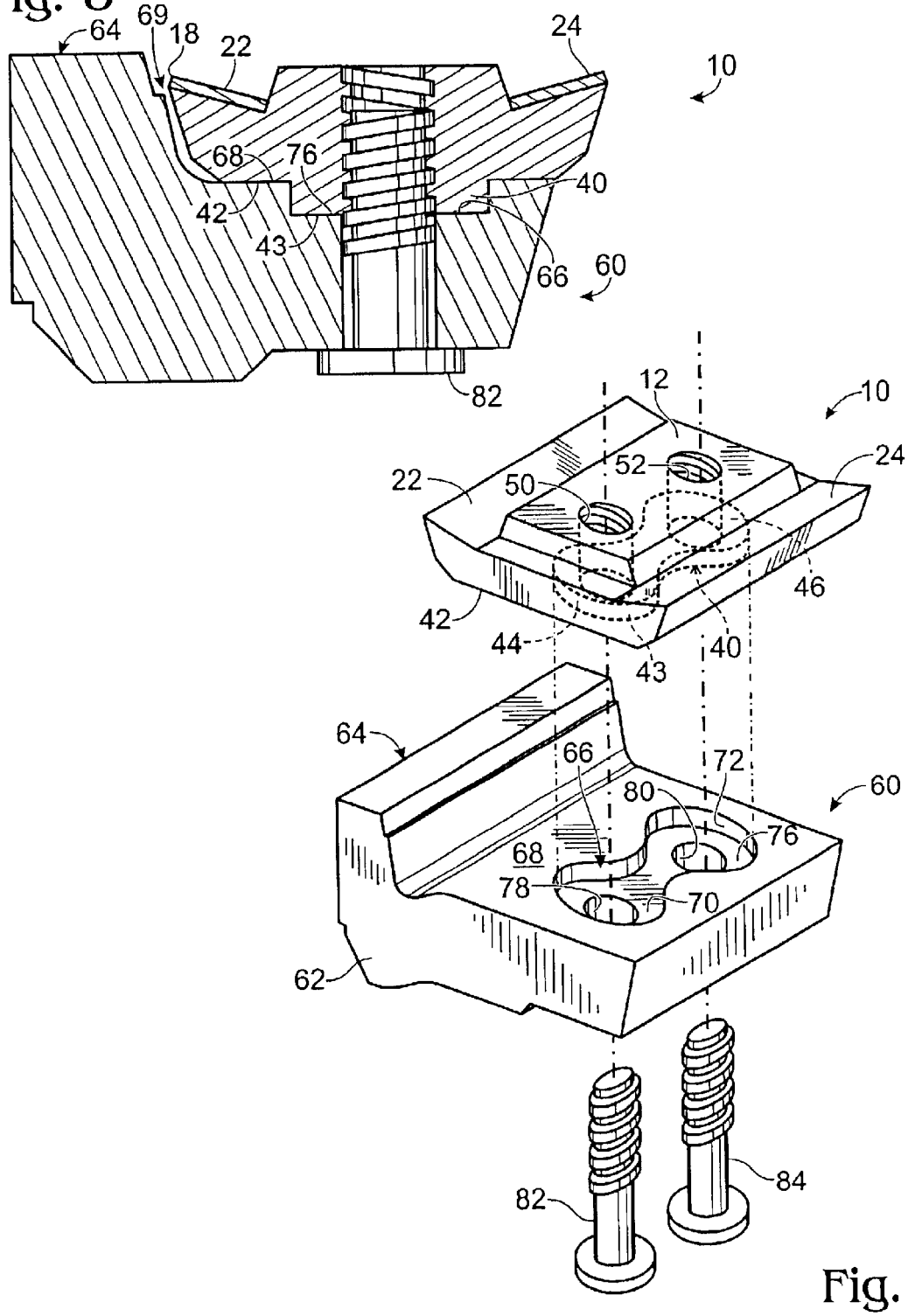

LOG DEBARKING TIP

FIELD OF THE INVENTION

This invention relates to rotary log debarkers, and more particularly a cutting tip for use in a rotary debarker.

BACKGROUND

Rotary log peelers, which are also known as ring debarkers, are used to remove bark from logs prior to the logs being further processed. There are several types of rotary log debarkers known in the art. Generally speaking, most rotary log debarkers utilize multiple cutting tips that are mounted on arms, which are in turn pivotally mounted in the body of the machine for axial movement toward a log that is being debarked. Each cutting tip includes a blade portion that cuts or scores the bark so that it is readily removed. As a log is advanced through the debarking machine, the cutting tips are rotated axially about the log. While this occurs the arms are urged axially inward toward the log and the blade portions of the tips are thus urged against the bark. The tips remove the bark from the log by cutting the bark in a spiral pattern.

Rotary log debarkers are effective devices for removing bark from logs to facilitate processing of the logs into lumber and other products. However, debarking machines operate in extreme environments and are subjected to significant forces during operation. Among other forces acting on debarking machines, there are substantial loads and mechanical shock applied against the cutting tips and the associated machinery during debarking operations. Debarking machines are manufactured sturdily to counteract some of the forces they encounter during use. Nonetheless, given the extreme environment in which debarking machines often operate, the machines require frequent maintenance. This is especially true of the cutting tips, which tend to be damaged and dulled with some frequency. As such, the tips need to be replaced at regular intervals. From a maintenance and economic standpoint, it is preferable to utilize tips that provide the maximum lifetime with minimal damage from normal wear and tear. Thus, the more robust that the tip is designed and manufactured, the less that the tip is damaged during use, and the longer it lasts.

There is a need therefore for improved tips for use in debarking machines.

SUMMARY OF THE INVENTION

A tip for a rotary debarker has a main body having a front surface and a rear surface, and a cutting blade along two opposed edges. The main body includes a non-circular mounting boss extending from the rear surface and the tip is reversible relative to a tip holder to provide two operative cutting blade on the same tip. The tip is mounted to a tip holder that has a complementary non-circular seat for receiving the non-circular mounting boss. The non-circular mounting boss and seat restrict relative movement between the tip and the holder during cutting operations.

BRIEF DESCRIPTION OF THE DRAWINGS

The invention will be better understood and its numerous objects and advantages will be apparent by reference to the following detailed description of the invention when taken in conjunction with the following drawings.

FIG. 1 is a front plan view of one illustrated embodiment of the tip of the invention.

FIG. 2 is a cross sectional view of the tip illustrated in FIG. 1, taken along the line 2—2 of FIG. 1.

FIG. 3 is a bottom side view of the tip illustrated in FIG. 1.

FIG. 4 is a back plan view of the tip illustrated in FIG. 1.

FIG. 5 is a front plan view of a holder for the tip illustrated in FIG. 1.

FIG. 6 is a cross sectional view of the holder illustrated in FIG. 5, taken along the line 6—6 of FIG. 5.

FIG. 7 is a cross sectional view of the holder illustrated in FIG. 5, taken along the line 7—7 of FIG. 5.

FIG. 8 is a cross sectional side view of the tip of FIG. 1 mounted to the holder of FIG. 5, with the view taken along the lines of the assembled tip and holder that correspond to lines 2—2 of FIG. 1 and 7—7 of FIG. 5.

FIG. 9 is an exploded perspective view of the tip and holder showing portions of the tip structure in phantom lines.

DISCLOSURE OF INVENTION

A tip 10 according to the illustrated embodiments of the present invention is shown in the figures and is defined by a polygonal main body 12, the outer periphery of which preferably defines a parallelogram. That is, while main body 12 may be formed such that the outer peripheral edges define a square or rectangle or other polygon, it is preferred that the opposed side edges 14, 16 join the top edge 18 and bottom edge 20 at oblique angles as best illustrated in FIGS. 1 and 4. As used herein, the word rectangular means a tip having a main body with an outer peripheral edge defined by two pairs of opposed edges, regardless of whether those edges are parallel, of equal length, or meet at right angles or oblique angles.

A pair of cutting blades attached to main body 12 along the top edge 18 and bottom edge 20, respectively, forms the working or cutting portion of tip 10. Thus, a first blade 22 is attached to and extends along top edge 18, and a second blade 24 is attached to and extends along bottom edge 20. Each blade is preferably hardened steel such as high carbide steel, although many other materials suffice. The blades are attached to the main body 12 by any appropriate means such as welding.

Third and fourth blades 26 and 28 may optionally be affixed to the opposed side edges 16 and 18. When used, the third and fourth blades are of the same material as the first and second blades, and are attached to the main body 12 in the same manner.

It will be appreciated that the cutting blades may likewise be formed by grinding the main body along its edges to sharpen the edges. The sharpened edges thus form knife-like cutting surfaces that may be substituted for separately attached cutting blades as illustrated.

Referring now to FIG. 2 it may be seen that blades 22 and 24 are fixed to main body 12 at an angle with respect to the plane defined by upper surface 30 of main body 12, the angle improving the cutting performance of the blades. The precise angle selected for mounting the blades to the main body is not critical. Likewise, when third and forth blades 26 and 28 are utilized, these blades may be mounted to body 12 at the same angles as blades 22 and 24.

A mounting boss 40 extends outwardly from the rear surface 42 of main body 12. As illustrated in FIG. 3, rear surface 42 is substantially planar and parallel to front surface 30. As described in greater detail below, the outer periphery of mounting boss 40 defines a non-circular shape that is received in a complementary non-circular seat in the tip holder. In one preferred embodiment illustrated in FIG. 4, the periphery of mounting boss 40 defines a figure 8 shape having a first lobe 44, a second lobe 46 and a connecting portion 48 extending therebetween. A pair of holes is bored through the mounting boss to facilitate attachment of the tip 10 to the tip holder. Specifically, a first hole 50 is bored through the center portion of lobe 44 and a second hole 52 is similarly bored through the center portion of lobe 46. Each hole 50 and 52 is threaded to receive a bolt, as described below. Mounting boss 40 extends outwardly from rear surface 42 by a distance X, which represents the distance measured from surface 42 to surface 43 in FIG. 2.

Tip 10 is mounted onto a tip holder 60, which is illustrated in isolation without tip 10 in FIGS. 5 through 7. Although not shown in the drawing figures, the tip holder 60 is attached to the end of an arm in a rotary debarking machine. The tip holder 60 is typically welded to the end of the arm so that the tip 10 is in a cutting position with respect to a log that moves through the debarker. Tips are bolted to the tip holders and may be replaced when necessary.

Tip holder 60 includes a main body 62 that has an L-shaped profile in side view. With reference to FIG. 7, main body 62 has a shoulder portion 64 extending from one edge thereof. The tip holder further includes a cavity or seat 66 formed in surface 68. Seat 66 is shown in the figures as defining a figure 8 shape that is complementary to the shape of mounting boss 40. In all instances, regardless of the non-circular shape of mounting boss 40, the seat 66 is formed in a shape that is complementary to the shape of the non-circular mounting boss. In the illustrations therefore, seat 66 includes a first lobe 70, a second lobe 72 and a connecting portion 74 extending therebetween. The depth of seat 66 (measured from surface 68 to the bottom surface 76 of the seat and labeled with distance Y in FIG. 6) is further substantially equal to the distance that mounting boss 40 extends away from surface 42 of main body 12. That is, distance X (FIG. 2) is substantially equal to distance Y (FIG. 6). Seat 66 includes a first hole 78 bored through lobe 70 and a second hole 80 bored through lobe 72. Both holes 78 and 80 are positioned in lobes 70, 72, respectively, so that the holes in the seat 66 align with the holes 50, 52 in tip 10 when the tip and tip holder are assembled.

Tip 10 is shown assembled with tip holder 60 in FIG. 8. With reference to that figure, it is seen that mounting boss 40 is received into seat 66 and that tip 10 is attached to tip holder 60 with a pair of bolts 82 and 84 (only one of which is shown in the cross sectional illustration of FIG. 8) that extend through tip holder 60 and thread into the aligned holes in the tip 10. Specifically, bolt 82 extends through hole 78 in tip holder 60 and is threaded into hole 50 in tip 10. Because the depth of seat 66 (distance Y) is substantially equal to the height of mounting boss 40 (distance X), surface 43 of mounting boss 40 abuts bottom surface 76 of seat 66 when the two parts are assembled. Likewise rear surface 42 of tip 10 abuts surface 68 of tip holder 60. In the illustration of FIG. 8, cutting blade 24 is the operational blade—that is, blade 24 is the blade that is positioned such that it make cutting contact with a log during normal use of the debarking machine.

Tip 10 is attached to tip holder 60 in such a manner that the tip is supported in the holder without contact between the tip and the holder except at the interface between the tip and the holder at the boss/seat, and at the abutting surfaces 43–76, and 42–68. Cutting blade 22, which is mounted on the opposite edge 18 of main body 12 from cutting blade 24, is spaced apart from L shaped shoulder portion 64 to define a gap 69 between shoulder portion 64 and main body 12. Stated in another way, tip 10 is mounted to holder 60 in such a manner that there is no contact between tip 10 and tip holder 60 except as shown in the figures and as described herein. In use, even as substantial force is applied to tip 10, the tip does not bear against the holder along edge 18 or cutting blade 22. While the shoulder portion 64 provides physical protection for the cutting blade 22 that is not in use, the blade 22 is not damaged by contact with the holder. This results in fewer problems caused deformation of the holder and tip, and prevents damage to the cutting blade that is not in use.

As noted above, the shape of seat 66 is complementary to the shape of non-circular mounting boss 40. The mounting boss and the seat are shaped and sized so that when the tip 10 is mounted in the tip holder 60 there is a closed tolerance between the outer peripheral edge of the mounting boss and the seat. Preferably, the outer peripheral edges of the mounting boss abut the peripheral edges of the seat 66 around the entire periphery of the mounting boss.

As noted above, during normal operation of a log debarking machine there are substantial forces applied to the tip 10. Among other forces are substantial rotational forces applied to the tip that tend to force the tip to rotate axially about the longitudinal axis defined by bolts 82, 84. In the illustrated embodiment with a figure 8 shaped mounting boss and seat, the mounting boss is received within the seat and the outer peripheral edges of the boss abut or are closely spaced from the edges of the seat. Relative motion between the tip 10 and holder 60 is resisted as rotational forces are applied on tip 10 (about the axis defined by bolts 82, 84) because the mounting boss is firmly held in the non-circular seat. To the extent that tip 10 is forced to rotate or otherwise move relative to tip holder 60, such movement is limited by the abutting surfaces of the peripheral edges of the mounting boss and the seat. Because the mounting boss and seat are non-circular in shape, rotational forces applied on the tip are dispersed over a significant amount of abutting surface area between the boss and the seat.

FIG. 9 illustrates tip 10, tip holder 60 and bolts 82, 84 in an exploded perspective view. As cutting blade 24 wears through use it becomes duller, and eventually needs to be replaced. The tip 10 is easily reversed to utilize cutting blade 22 on the same tip by removing bolts 82 and 84, removing tip 10 from tip holder 60, rotating the tip 180° relative to holder 60 and replacing the repositioned tip with the mounting boss in the seat, and finally reattaching bolts 82 and 84. Because the manner of mounting tip 10 to holder 60 maintains spacing between the cutting blade and shoulder portion 64, and because the tip is unable to rotate relative to the tip holder, the unused blade is not damaged by contact with the tip holder during use. Furthermore, because the figure 8-shaped mounting boss is symmetric on either side of a centerline between lobes 44, 46 and normal to the axis of the bolts 82, 84, the tip may be rotated 180° relative to the holder and may be reinstalled with the boss fitting precisely into the seat. Stated in another way, the seat is a mirror image of the figure 8 shaped mounting boss when the tip is in a first position where cutting blade 24 is being used, and also when the tip is rotated 180° relative to the holder so that the tip is in a second position where cutting blade 18 is being used.

Although in one preferred embodiment the mounting boss 40 and the seat 66 define complementary figure 8 shapes, the purposes of the invention are accomplished with any non-cylindrical shape to prevent the mounting boss from rotating in the seat, so long as the non-cylindrical shape of the boss is symmetric and mirrored by a non-cylindrical seat that allows reversal of the tip relative to the holder. That is, relative motion between the tip and the tip holder is prevented by forming the mounting boss in any non-circular shape and forming the seat in tip holder 60 with a complementary non-circular shape. So long as the mounting boss and the seat are sized so that the peripheral edges of the boss are in close proximity to or abut the edges of the seat as rotational forces are applied to the tip, relative motion between the two members is avoided and forces applied to the tip are spread over a substantial abutting surface area, thereby increasing the strength of the assembly. Without limitation and by way of example, the mounting boss may be polygonal or elliptical, or even irregular in shape such as where a keyway structure is used. Stated in another way, the mounting boss is configured such that the periphery of the boss defines an irregular radius measured from an axis through the boss that is parallel to the longitudinal axis of the bolt or bolts that attach the tip to the tip holder. Further, the invention's purposes may be accomplished with dual bosses and seats, each of which is non-circular in shape.

It will be appreciated that where a non-cylindrical mounting boss and correspondingly shaped non-cylindrical seat arrangement is used, to make the tip reversible relative to the holder so that each tip has two useful cutting edges along opposed edges of the tip, the non-cylindrical mounting boss and corresponding seat must be fabricated to engage one another when the tip is rotated 180° relative to the holder. That is, the seat must always define a mirror image of the mounting boss when the tip is in a first position where the mounting boss engages the seat, and also when the tip is rotated 180° from the first position into a second position, where the mounting boss also must engage the seat.

Although preferred and alternative embodiments of the present invention have been described, it will be appreciated by one of ordinary skill in this art that the spirit and scope of the invention is not limited to those embodiments, but extend to the various modifications and equivalents as defined in the appended claims.

What is claimed is:

1. A cutting tip and holder assembly for a rotary debarking machine, comprising:
   a cutting tip having a main body with a front surface and a rear surface, at least two opposed edges with a cutting blade along each of the at least two opposed edges and at least one bore through the main body defining a bore axis, and a non-circular mounting boss extending from the rear surface;
   a holder having a non-circular seat configured for receiving the mounting boss in a first orientation, and for receiving the mounting boss in a second orientation in which the tip is rotated by 180° relative to the holder, said holder further including a shoulder portion, and the cutting tip is mounted to the holder such that one cutting blade is in an operative position and the cutting blade along the opposite edge is in a spaced apart relation to the shoulder.

2. The cutting tip and holder assembly according to claim 1 wherein the main body defines a rectangular member having two pairs of opposed edges and wherein a cutting blade is attached to each of the opposed edges of at least one of said pairs.

3. The cutting tip and holder assembly according to claim 2 wherein the rectangular member defines a parallelogram.

4. The cutting tip and holder assembly according to claim 3 wherein each edge of the parallelogram includes a cutting blade attached thereto.

5. The cutting tip and holder assembly according to claim 1 wherein there is a gap between the cutting blade and the shoulder when the second orientation.

6. The cutting tip and holder assembly according to claim 5 wherein the non-circular mounting boss is substantially figure 8 shaped.

7. The cutting tip and holder assembly according to claim 6 wherein the figure 8 shape includes first and second lobes with a connecting portion therebetween, and wherein the at least one bore extends through a central portion of one of said lobes.

8. The cutting tip and holder assembly according to claim 7 including two bores through the main body, one bore through a central portion of each of said lobes.

9. A cutting tip assembly, comprising:
   a cutting tip defined by a main body having a front surface and a rear surface, at least two opposed edges with a first cutting blade along one the at least two opposed edges and a second cutting blade along the other of the at least two opposed edges, and a non-cylindrical mounting boss extending from the rear surface;
   a cutting tip holder having a non-cylindrical seat configured for receiving the mounting boss;
   wherein said tip is configured for mounting in said holder in a first position with said mounting boss received in said seat such that said first cutting blade is held in an operative position, and said second cutting blade is in a spaced apart relationship with a shoulder member formed on said holder, and wherein said tip is configured for mounting in a second position with said mounting boss received in said seat such that said second cutting blade is held in an operative position and said first cutting blade is in a spaced apart relationship with said shoulder member.

10. The cutting tip assembly according to claim 9 including at least one bore through said tip and at least one bore through said cutting tip holder, wherein said at least one bore through said tip aligns with said at least one bore through said holder when the tip is mounted to said holder, and further including an attachment member for attaching said tip to said holder.

11. The cutting tip assembly according to claim 9 wherein the cutting tip main body defines a rectangular member having two pairs of opposed side edges and wherein a cutting blade is attached to the opposed side edges of at least one of said pairs.

12. The cutting tip assembly according to claim 9 wherein said mounting boss defines a substantially figure 8 shape having a first lobe and a second lobe with a bore through each of said lobes, and wherein said seat is shaped in a mirror image of said mounting boss.

13. A tip for a rotary debarking machine, comprising:
   a rectangular main body having opposed side edges, opposed top and bottom edges, the top and bottom edges each defining a cutting blade, a front surface and a rear surface, said body having at least one bore formed therethrough from the front to the rear surface and defining a bore axis, and a boss extending from the rear surface, and
   a holder having a seat configured for receiving the boss in a first orientation, and for receiving the boss in a second orientation in which the main body is rotated by 180° relative to the holder, said holder including a shoulder portion that shields a cutting blade when the boss is in both the first and second orientations.

14. The tip according to claim 13 wherein said boss includes a peripheral edge portion that defines a figure 8 shape.

15. The tip according to claim 13 wherein said boss includes a peripheral edge portion that defines a polygon.

16. The tip according to claim 13 wherein the main body defines a polygon having two pairs of opposed side edges that intersect at oblique angles and wherein a cutting blade is attached to the opposed side edges of at least one of said pairs.

17. The cutting tip according to claim 16 wherein the polygon defines a parallelogram.

18. The cutting tip according to claim 17 wherein each side edge of the parallelogram includes a cutting blade attached thereto.

* * * * *